April 25, 1944.   R. E. SPRENKLE   2,347,637
LIQUID-LEVEL MEASURING APPARATUS
Filed Nov. 20, 1940    2 Sheets-Sheet 1

Inventor
RAYMOND E. SPRENKLE
By Raymond W. Jenkins
Attorney

April 25, 1944.   R. E. SPRENKLE   2,347,637
LIQUID-LEVEL MEASURING APPARATUS
Filed Nov. 20, 1940   2 Sheets-Sheet 2

Inventor
RAYMOND E. SPRENKLE
By Raymond W. Junkins
Attorney

Patented Apr. 25, 1944

2,347,637

UNITED STATES PATENT OFFICE 2,347,637

LIQUID-LEVEL MEASURING APPARATUS

Raymond E. Sprenkle, Cleveland Heights, Ohio, assignor to Bailey Meter Company, a corporation of Delaware Application November 20, 1940, Serial No. 366,446

6 Claims. (Cl. 73—299)

The present invention relates to liquid level measuring means, such as meters for providing an indication, record, or other visual manifestation of the level of liquid in a container; or for use as the motivating and guiding means for control apparatus.

One particular field of application for such apparatus is in the measurement of the amount of liquid in a vapor generator. A vapor generator of the general type to be considered here usually comprises banks of tubes between headers or drums and the whole heated by the combustion of fuel in a furnace. Usually a drum is located at the highest elevation of the assembly and forms a separation zone for liquid and vapor with a portion of the drum containing liquid and a portion containing vapor.

It is important in the operation of a vapor generator that a substantially constant amount of water be contained in the assembly at all times and at all rates of operation. Should the liquid level recede from the separation drum into the tubes, thus exposing portions of the tubes directly to the heat of the furnace without internal liquid cooling, then such tubes may burn or blister. Should the liquid level be allowed to rise excessively, then there is danger of liquid entering the superheater with a corresponding lowering of the exit steam temperature and, in extreme cases, the danger of liquid being carried over to the turbine.

It is therefore of primary importance that the liquid level in the separation drum be maintained within certain predetermined safe or desirable limits of vertical elevation. This is accomplished by controlling the rate of liquid inflow or supply to replace that which has been discharged in the form of vapor and using a measure of liquid level either as a visual guide to manual regulation or as a dictator in an automatic feed water regulator or control system.

Until comparatively recently the ordinary steam boiler was operated at pressures of only 100 to 200 pounds per square inch gage and at relatively low rates of output. The advent of higher steam pressures resulted in smaller diameter drums and corresponding decrease in water storage, while the simultaneous rise in normal rates of operation greatly increased the possibility of a widely and rapidly swinging water level and the possible hazard. When it is understood that the water stored in the drum of a modern high pressure boiler would be evaporated out in a matter of seconds should the supply fail, it will be appreciated that the problem of actually determining the true water level at all times in the drum of such a vapor generator is of considerable importance.

Devices of various types have been used in the past for determining the level of liquid in containers, including such containers as a vapor generator operating under pressure. There has, however, so far as I have been able to ascertain been no one who has previously taken into consideration and compensated for certain errors of measurement in connection with determining the liquid level in modern vapor generators. As the present description proceeds the problem will be explained as will be my invention in connection therewith in preferred form.

Figures 1, 4:
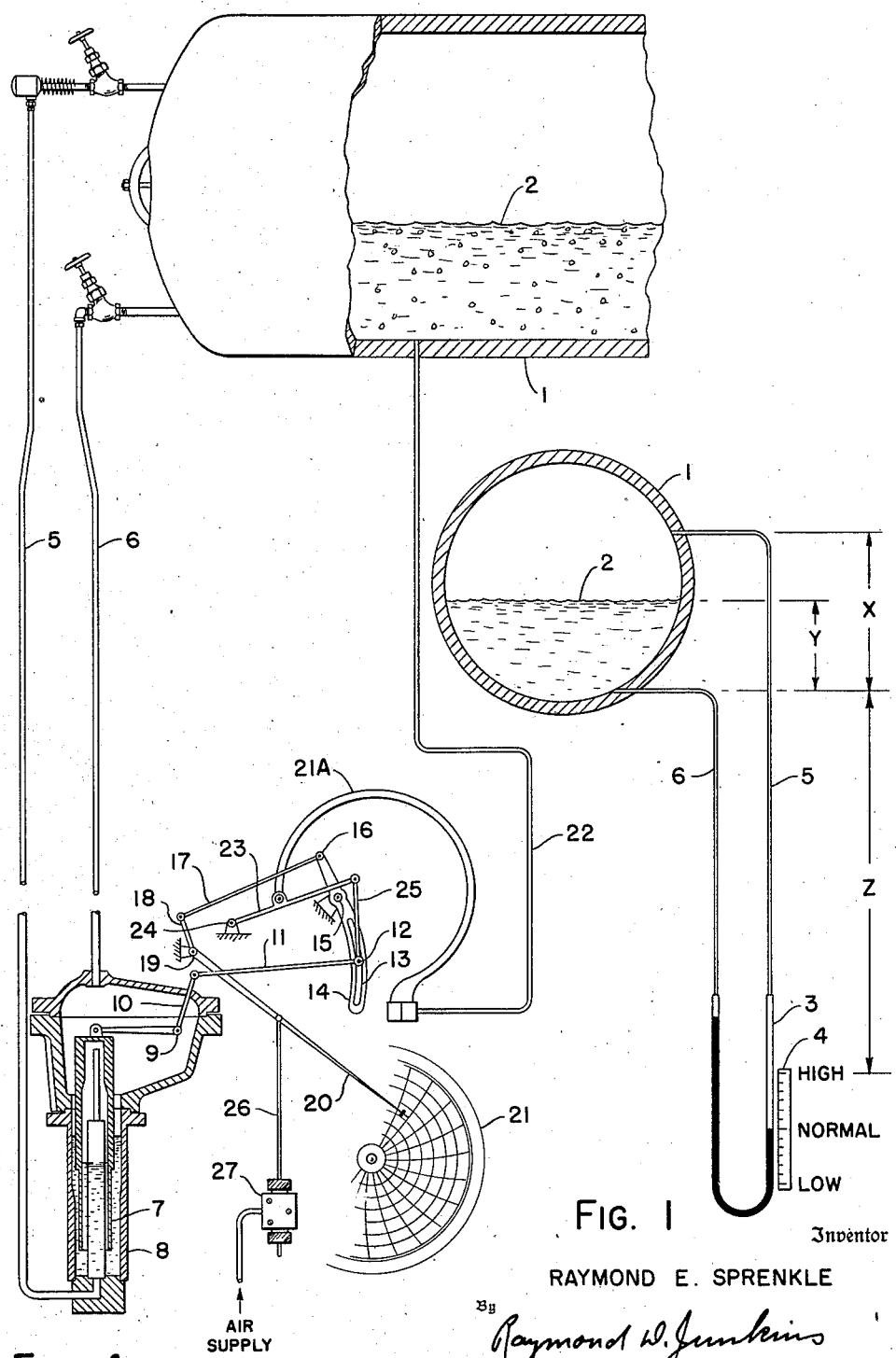
Fig. 1 is a diagrammatic analysis of a fundamental way of measuring liquid level.
Fig. 4 is a somewhat diagrammatic arrangement of my invention applied to the drum of a vapor generator.

Referring first to Fig. 1, I illustrate therein in elevation a drum 1 containing liquid and vapor and having a normal liquid level 2. Connected across the vertical elevation of the drum 1 is a mercury U-tube manometer 3 (shown to exaggerated scale) having a scale 4 which may be graduated in inches of mercury, or in equivalent inches of water at predetermined temperature, for example in inches of cold water.

The hydraulic head effective on the right-hand leg 5 of the manometer is constant and is equal to $Z+X$ inches of water as pipe 5 always contains condensate. The hydraulic head effective on the left-hand leg 6 of the manometer varies with the amount of liquid in drum 1 and is equal to $Z+Y$ inches of water. As Z remains constant the effective head or differential pressure acting upon the U-tube 3 at any instant is equal to $X-Y$ and is, therefore, a measure of the liquid level 2 within the drum 1.

The U-tube 3 and scale 4 would be calibrated with cold water, i. e. 70° for example, and the scale 4 so adjusted that when no differential pressure is applied to the U-tube the mercury in the two legs will be at the same height and opposite "High" on the scale. That is, with Y equaling X. In operation as Y decreases in value relative to X with a lowering of liquid level in the drum 1, the differential head applied to the U-tube increases until the mercury level in leg 5 reaches "Low" on scale 4.

As the vapor generator is heated up and vapor collects in the drum 1 above the level 2, the static pressure within the vapor generator and drum will rise to the value at which the boiler is to be placed in service. During this starting up process, and under normal operation, a saturation temperature-pressure relation exists within the drum 1, as is well known. That is, for every value of static pressure there is a definite value of temperature for the steam and water in drum 1. And of particular interest here is that there is a corresponding value of density of the liquid in the drum 1 for each value of pressure, thus:

| Saturation | | Density |
|---|---|---|
| Pressure p. s. i. gage | Temperature | |
| | °F. | Lbs./cu. ft. |
| Atmospheric | 70 | 62.27 |
| 200 | 388 | 54.20 |
| 500 | 470 | 50.60 |
| 1,000 | 546.4 | 46.28 |
| 1,500 | 597.5 | 42.88 |
| 2,000 | 636.8 | 38.80 |
| 2,440 | 665.4 | 35.26 |
| 2,725 | 681.7 | 32.37 |

It will thus be apparent that the density of the water in that portion Y of manometer leg 6 may vary radically from the density of the calibrating water at atmospheric pressure and 70° F. For example, its density when the boiler is operating at 598° F. is 30% less than at 70° F., and consequently the effective weight of the boiler drum water leg Y will be 30% less than the water leg Y in column 5. Thus the manometer will be in error by the ratio of the densities of the water of Y (leg 6) to Y (leg 5).

This is, of course, on the basis that the manometer is calibrated to read correctly when the water leg Y6 is at atmospheric conditions. It is also possible to calibrate the manometer corrected to the density of the water leg Y6 under operating conditions. For example, a specific modern vapor generator is designed to operate at 665.4° F. with a top of 681.7°. The water level device may well be calibrated to take into account the density of the drum water in leg Y6 when operating at 665.4° F., namely, a density of 35.26 lbs. per cu. ft. as compared to 62.27.

Figure 2:
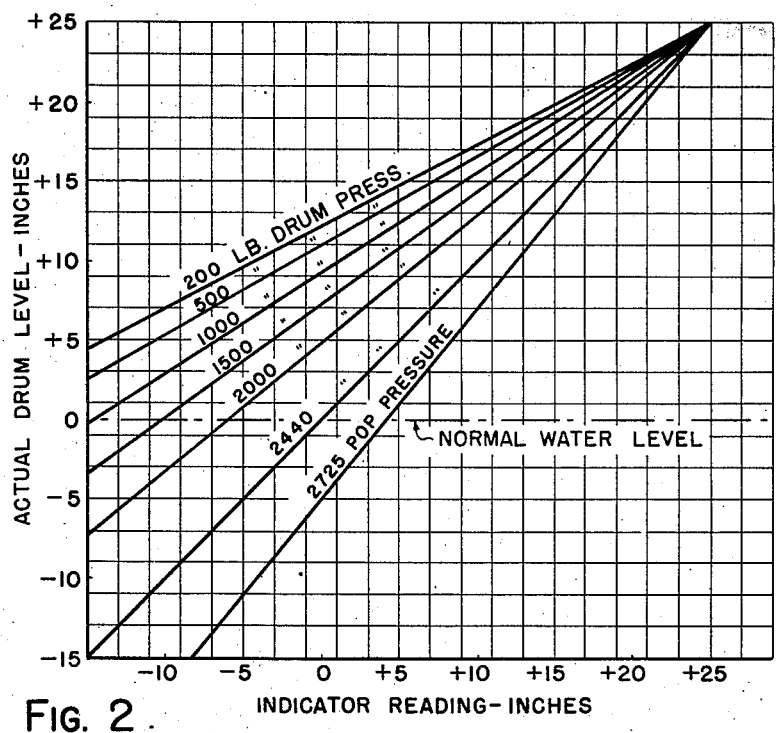
Figs. 2 and 3 are curves used in explaining the problem which I have solved.

This may be more clearly brought out by reference to Fig. 2, which is a family of curves showing variations in readings on a drum water level indicator for the vapor generator mentioned. The actual level of water in the drum in inches is plotted against the reading in inches on the mercury manometer with the latter calibrated to read correctly when the boiler is operating at a pressure of 2440 p. s. i. and with the drum level at normal (marked 0) of about midway the height of the drum. Assuming that the pressure remains constant at 2440 p. s. i. with a corresponding saturation temperature of 665.4° F. and density of the water Y6 of 35.26 (all conditions to which the indicator has been calibrated), then the indicator will correctly show the level of liquid within the drum.

If, however, the pressure varies from design pressure of 2440 p. s. i. and, for example, to a pressure of 1500 p. s. i., with corresponding change in water temperature of from 665.4° F. to 597.5° F. and change in density of from 35.26 to 42.88 lbs. per cu. ft.; with the actual water level remaining constant at normal the indicator will incorrectly show that the actual water level is −10, or 10″ below desired level. It will be quite apparent how misleading such information would be to an operator, or as dictating to a control system.

Figure 3:
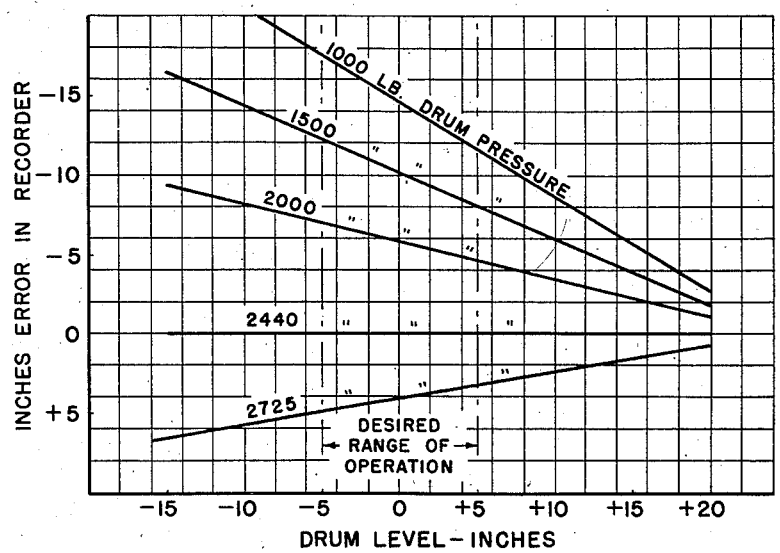

Furthermore, if in the meantime the actual level has shifted, then the indicator reading becomes even more misleading. If the actual level has risen to +5 (for the new temperature of 597.5) the indicator will read −3, while if the actual level has fallen to −5 the indicator would read −17. At zero (normal) actual level the error amounts to 10″, at +5 to 8″, and at −5 to 12″. This error has been plotted in the corresponding curve of Fig. 3.

If it were expected that a vapor generator designed for operation at a certain temperature and pressure would operate in a definite range below these conditions, then a water level device might be calibrated for the temperature and pressure conditions midway of the expected range of operation, and thus minimize the errors encountered. This is not usually possible and, in fact, on the higher pressure jobs it has been found desirable to operate for considerable periods of time at pressure and temperature standards considerably different from those at which the unit was designed. For example, the unit having a top of 2725 p. s. i. may operate for a number of days at 500 p. s. i., some days at 1500 p. s. i., and eventually be operated for a period of time at 2440 p. s. i. In coming from a cold condition it requires several hours to warm up the unit and bring it through the various pressure ranges to the desired operating pressure.

Under these conditions it will be quite apparent that an ordinary U-tube manometer connected across the drum 1 will be of little or no value as a guide to the operator, nor useful in automatic feed water supply control, and in fact will be definitely misleading. To the best of my knowledge however, no one has previously suggested a method and means whereby the actual and true level of liquid within such a vapor generator may be continuously indicated, recorded, or utilized as a dictator for control or regulation irrespective of the range in saturation temperature-pressure-density through which the vapor generator passes in coming into service, or while in operation. It is a primary object of my invention to provide the necessary system and apparatus for solving this problem, and which I now explain in connection with Fig. 4 of the drawings.

In Fig. 4 the pressure connections 5, 6 are tapped into the boiler drum 1 at a distance of about 40″ apart in vertical elevation. In this particular embodiment the mercury U-tube to which the connections 5, 6 are connected takes the form of a mercury sealed inverted bell 7 in a pressure chamber 8 through the arm of which extends a pressure tight bearing for a spindle 9. As the water level 2 rises or falls in the drum 1, the corresponding change in hydraulic head applied to the mercury U-tube causes the inverted bell 7 to rise and fall in proportionate amount and to rotate the spindle 9, a portion of which passes external of the casing 8.

Fastened to the spindle 9, and rotated thereby, is an arm 10 pivotally connected to a link 11 which joins a roller 12 adapted to be positioned in a slot 13 of an arm 14. The arm 14 is pivoted at 15 and has at its other end a pivot 16 to which is connected a link 17, in turn connected to an arm 18 which is pivoted intermediate its ends as at 19 and carries at its far end a pen 20 adapted to cooperate with an index or chart 21.

The arrangement so far described, upon change in level 2 and corresponding change in vertical position of the bell 7, causes an angular movement of the arm 10 around the pivot 9 resulting in a pull or push of the link 11 which is transmitted through the roller 12 to the arm 14. The latter pivots around 15 and causes the link 17 to push or pull the bell crank 18 around its pivot 19. Thus a vertical movement of the bell 7 results in an angular movement of the pen 20 around its pivot 19 and relative to the index or chart with which it cooperates.

Assuming that the boiler drum 1 is at the temperature-pressure-density condition for which the system has been designed, then the pivot 12 will be at a predetermined location in the slot 13 and thus at predetermined distance from the pivot 15.

My present invention resides in the provision for compensating the water level measuring device for changes in density of the water within the drum 1 from that for which the system has been calibrated. Inasmuch as the water and steam within the drum follow a definite saturation condition wherein temperature-pressure-density values bear predetermined relation to each other; and inasmuch as it is temperature variation rather than pressure variation that causes a change in density of the liquid in the drum 1, I have found that either a measure of temperature or a measure of pressure within the drum 1 may be used to ascertain the value of density of the liquid therein, or may be used directly as a compensating force for positioning. However, it is far simpler in a practical sense to obtain a measure of pressure within the drum 1 than it is to obtain a measure of temperature, so that I preferably employ apparatus which will continually determine the value of the pressure within the drum and utilize such determination in compensating the measuring apparatus.

I wish it to be distinctly understood, however, that my invention is not limited to compensating the water level measuring device for variations in pressure, but that I contemplate in a broader sense the compensation for variations in change of density of a liquid forming one leg of a mercury manometer and irrespective as to whether the density or density change is determined by a measure of temperature or of pressure. In other words, I might equally as well have shown in Fig. 4 a means for determining the temperature of the liquid within the drum 1 as to have shown the means for determining the pressure.

In Fig. 4 I illustrate at 21A a Bourdon tube connected by the pipe 22 with the drum 1 and adapted to position its free end within certain limits upon change in pressure within the drum 1. The free end of the Bourdon tube 21A is pivotally connected to a beam 23 which has one end pivoted as at 24 and the other end pivotally connected to a link 25. Clockwise movement of the free end of the Bourdon tube 21A, indicative of an increase in pressure, therefore causes the link 25 to be positioned upwardly. Conversely a counter-clockwise rotation of the free end of the Bourdon tube 21A, indicative of a decrease in pressure within the drum 1, will cause a downward positioning of the link 25.

It will be observed that the link 25 is joined at its lower end with the pivot roller 12 movable in the slot 13. Thus a positioning of the link 25, through the agency of the Bourdon tube 21A, is in effect a positioning of the roller 12 in the slot 13, and correspondingly a varying of the radius of action of the roller 12 relative to the pivot 15. Thus a variation in temperature and density of the liquid in the drum 1, as represented by variations in the value of pressure therein, is effective in positioning the Bourdon tube 21A, causes a change in the radius of the roller 12 relative to the pivot 15, and thereby a positioning of the pen 20 either to compensate for a change in pressure (with resulting change in density) with a constant liquid level 2 or for a combination of the two.

It will be quite apparent that I have thus provided a means for automatically compensating a measuring device of liquid level for changes in density of the liquid in one leg of the manometer. To the pen 20 I may suspend the stem 26 of an air pilot 27 forming a part of a control system adapted to control the supply of liquid feed to the boiler for example.

What I claim as new, and desire to secure by Letters Patent of the United States, is:

1. A water level indicator including in combination, a mercury U-tube having two legs, one of the legs containing above the mercury a relatively constant height of relatively cold water, the other of said legs having above the mercury a column of water varying in height as the level of the water to be determined and subject to variations in density, means for indicating variations in the height of mercury in the U-tube, and hydrostatic means so associated with the water to be measured as to be positioned responsive to such variations in density and said hydrostatic means being arranged to continuously compensate the indications of the mercury column.

2. In combination, a liquid level indicating device for a high pressure boiler arranged to compare the weight of two columns of liquid, one of the columns being substantially constant in height and in density, the other column varying in height with the liquid level in the boiler to be determined and varying in density with the temperature of the liquid whose level is to be determined, and means including a steam pressure gage independently connected to the boiler and continuously compensating the indicating device for variations in such density with temperature.

3. In combination with a vapor generator having a liquid-vapor separation zone, an instrument for continuously determining the level of liquid in the assembly and arranged to compare the vertical height of liquid in the vapor generator with a separate column of liquid external of the vapor generator and of substantially uniform height and density, and means independently sensitive to steam pressure as distinguished from head in the operation of the vapor generator constructed and arranged to continuously compensate the instrument.

4. A liquid level determining instrument having a mercury U-tube, one leg of the U-tube subjected to a substantially constant height column of liquid of substantially invariable density, the other leg of the U-tube subjected to a column of liquid whose height varies with the liquid level to be determined and whose density varies with the density of the liquid whose level is to be determined, means for indicating variations in height of mercury in the U-tube, and means sensitive to the variable density continuously compensating the indicating means of the instrument.

5. A liquid level measuring apparatus comprising in combination, two legs, one of the legs containing a liquid column of relatively constant height and density, the other of the legs containing a column of liquid varying in height as the level of the liquid to be measured and subject to variations in density, a device connecting the two legs adjacent their bases for comparing the weight of the two columns of liquid, continuously responsive means associated with said device for measuring the difference in weight of the two columns of liquid, an additional hydrostatic column varying in height as the level of the liquid to be measured and subject to the same variations in density, said last column being associated with a separate measuring device continuously responsive to the said density only, and means for compensating said continuously responsive means at all times by the said density responsive means for such variations in density.

6. An apparatus for determining the true water level in a vapor generator or the like having a liquid-vapor separation zone comprising in combination, manometer means constructed and arranged to compare the vertical height of water in the vapor generator with a separate column of liquid external of the vapor generator and of substantially uniform height and density, and an additional independent liquid column varying in height as the level of the water in the vapor generator and subject to the same variations in density and leading from the vapor generator, and mechanism operatively and solely associated with and responsive to the lower end of the additional liquid column mechanically connected to the manometer means for constantly compensating the comparison made by the manometer means for variations in density of the water in the vapor generator.

RAYMOND E. SPRENKLE.